United States Patent
Lewin et al.

(10) Patent No.: US 12,238,180 B2
(45) Date of Patent: *Feb. 25, 2025

(54) UPDATING AN APPLICATION AT A SECOND DEVICE BASED ON RECEIVED USER INPUT AT A FIRST DEVICE

(71) Applicant: Malikie Innovations Limited, Dublin (IE)

(72) Inventors: Mathias Lewin, Rydebäck (SE); Leif Fredrik Ademar, Löddeköpinge (SE); Terrill Mark Dent, Waterloo (CA); Michael Stephen Brown, Kitchener (CA)

(73) Assignee: Malikie Innovations Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/334,109

(22) Filed: Jun. 13, 2023

(65) Prior Publication Data
US 2023/0328141 A1 Oct. 12, 2023

Related U.S. Application Data

(63) Continuation of application No. 13/869,555, filed on Apr. 24, 2013, now Pat. No. 11,716,392.

(51) Int. Cl.
*H04L 67/141* (2022.01)

(52) U.S. Cl.
CPC .................................. *H04L 67/141* (2013.01)

(58) Field of Classification Search
CPC ........................................................ H04L 67/141
USPC ........................................................... 709/204
See application file for complete search history.

(56) References Cited

U.S. PATENT DOCUMENTS

| | | |
|---|---|---|
| 5,508,713 A | 4/1996 | Okouchi |
| 6,006,239 A | 12/1999 | Bhansali et al. |
| 6,191,807 B1 | 2/2001 | Hamada et al. |
| 6,463,460 B1 | 10/2002 | Simonoff |
| 6,545,669 B1 | 4/2003 | Kinawi et al. |
| 6,560,637 B1 | 5/2003 | Dunlap et al. |
| 6,757,365 B1 | 6/2004 | Bogard |
| 7,930,347 B2 | 4/2011 | Maxwell et al. |
| 7,941,399 B2 | 5/2011 | Bailor et al. |
| 7,953,112 B2 | 5/2011 | Hindus et al. |
| 8,346,864 B1 | 1/2013 | Amidon et al. |
| 8,429,678 B1 | 4/2013 | Parthiban et al. |
| 8,565,741 B2 | 10/2013 | Yang |
| 8,694,165 B2 | 4/2014 | Smith et al. |

(Continued)

OTHER PUBLICATIONS

Parish, Kevin; "Control Your Android Phone Via PC With AirDroid"; Tom's Guide; Dec. 2, 2011; 6 pages.

(Continued)

*Primary Examiner* — David P Zarka
(74) *Attorney, Agent, or Firm* — Conley Rose, P.C.; J. Robert Brown, Jr.

(57) ABSTRACT

A method of generating a display object is provided, the method comprising operating a first processor comprised within a first device to: execute an application; generate an display object associated with the application; output the active display object on the first device; transmit the display object to a second device for output by the second device; and receive user input to the application via the display object output on the second device.

20 Claims, 11 Drawing Sheets

(56) References Cited

U.S. PATENT DOCUMENTS

| | | | |
|---|---|---|---|
| 8,990,150 | B2 | 3/2015 | Bailor |
| 9,053,079 | B2 | 6/2015 | Bailor et al. |
| 9,124,657 | B2 | 9/2015 | Bhogal et al. |
| 9,286,597 | B2 | 3/2016 | Rampson |
| 9,507,757 | B2 | 11/2016 | Matas et al. |
| 9,596,320 | B2 | 3/2017 | Thomas et al. |
| 9,852,120 | B2 | 12/2017 | Rochelle et al. |
| 10,057,226 | B2 | 8/2018 | Bailor et al. |
| 10,114,821 | B2 * | 10/2018 | Rizk ................ G06F 40/10 |
| 10,353,718 | B2 * | 7/2019 | Kimpton ............ G06F 9/451 |
| 11,716,392 | B2 * | 8/2023 | Lewin ............. H04L 67/141 709/204 |
| 2002/0069265 | A1 | 6/2002 | Bountour et al. |
| 2002/0078153 | A1 | 6/2002 | Chung et al. |
| 2002/0085029 | A1 | 7/2002 | Ghani |
| 2002/0143878 | A1 | 10/2002 | Birnbaum et al. |
| 2002/0152271 | A1 | 10/2002 | Chafle et al. |
| 2003/0208541 | A1 | 11/2003 | Musa |
| 2004/0093387 | A1 | 5/2004 | Wick |
| 2004/0177116 | A1 | 9/2004 | McConn et al. |
| 2005/0262535 | A1 | 11/2005 | Uchida et al. |
| 2006/0010197 | A1 | 1/2006 | Ovenden |
| 2006/0085515 | A1 | 4/2006 | Kurtz et al. |
| 2007/0011231 | A1 | 1/2007 | Manion et al. |
| 2007/0264976 | A1 | 11/2007 | Lessing et al. |
| 2008/0212490 | A1 | 9/2008 | Greve et al. |
| 2008/0216125 | A1 | 9/2008 | Li et al. |
| 2009/0140986 | A1 | 6/2009 | Karkkainen et al. |
| 2009/0164581 | A1 | 6/2009 | Bove et al. |
| 2010/0138744 | A1 | 6/2010 | Kamay et al. |
| 2010/0259491 | A1 | 10/2010 | Rajamani et al. |
| 2011/0029892 | A1 | 2/2011 | Kurtz et al. |
| 2011/0035683 | A1 | 2/2011 | Stead et al. |
| 2011/0181492 | A1 | 7/2011 | Soeda |
| 2011/0281566 | A1 | 11/2011 | Davis et al. |
| 2011/0320044 | A1 | 12/2011 | Smith et al. |
| 2012/0054640 | A1 | 3/2012 | Nancke-Krogh |
| 2012/0192055 | A1 | 7/2012 | Antebi et al. |
| 2012/0203844 | A1 | 8/2012 | Wang et al. |
| 2012/0284638 | A1 | 11/2012 | Cutler et al. |
| 2013/0018939 | A1 | 1/2013 | Chawla et al. |
| 2013/0141456 | A1 | 6/2013 | Sokolov et al. |
| 2013/0174191 | A1 | 7/2013 | Thompson, Jr. et al. |
| 2013/0222519 | A1 | 8/2013 | Lee et al. |
| 2013/0242708 | A1 * | 9/2013 | Siu ................ G06Q 10/109 368/10 |
| 2014/0006516 | A1 | 1/2014 | Nivala et al. |
| 2014/0025744 | A1 | 1/2014 | Kim et al. |
| 2014/0281951 | A1 | 9/2014 | Megiddo et al. |
| 2014/0289645 | A1 | 9/2014 | Megiddo et al. |
| 2014/0310345 | A1 | 10/2014 | Megiddo et al. |
| 2017/0289645 | A1 | 10/2017 | Song et al. |

OTHER PUBLICATIONS

Calvin; "AirDroid Lets You Control Your Android Device with Your PC"; Pinoy Tech Blog; Jan. 17, 2012; 8 pages.

"The American Heritage Dictionary of the English Language"; Houghton Mifflin; 3rd Edition; 1992; 3 pages.

Office Action dated Apr. 24, 2015; U.S. Appl. No. 13/869,555, filed Apr. 24, 2013; 10 pages.

Final Office Action dated Oct. 23, 2015; U.S. Appl. No. 13/869,555, filed Apr. 24, 2013; 10 pages.

Advisory Action dated Mar. 23, 2016; U.S. Appl. No. 13/869,555, filed Apr. 24, 2013; 5 pages.

Office Action dated Jul. 1, 2016; U.S. Appl. No. 13/869,555, filed Apr. 24, 2013; 12 pages.

Final Office Action dated Jan. 12, 2017; U.S. Appl. No. 13/869,555, filed Apr. 24, 2013; 12 pages.

Advisory Action dated Jun. 1, 2017; U.S. Appl. No. 13/869,555, filed Apr. 24, 2013; 6 pages.

Office Action dated Aug. 11, 2017; U.S. Appl. No. 13/869,555, filed Apr. 24, 2013; 13 pages.

Office Action dated Feb. 26, 2018; U.S. Appl. No. 13/869,555, filed Apr. 24, 2013; 18 pages.

Final Office Action dated Sep. 21, 2018; U.S. Appl. No. 13/869,555, filed Apr. 24, 2013; 23 pages.

Advisory Action dated Dec. 31, 2018; U.S. Appl. No. 13/869,555, filed Apr. 24, 2013; 9 pages.

Office Action dated Apr. 4, 2019; U.S. Appl. No. 13/869,555, filed Apr. 24, 2013; 19 pages.

Final Office Action dated Sep. 27, 2019; U.S. Appl. No. 13/869,555, filed Apr. 24, 2013; 16 pages.

Advisory Action dated Feb. 3, 2020; U.S. Appl. No. 13/869,555, filed Apr. 24, 2013; 6 pages.

Office Action dated Jun. 8, 2020; U.S. Appl. No. 13/869,555, filed Apr. 24, 2013; 27 pages.

Final Office Action dated Oct. 9, 2020; U.S. Appl. No. 13/869,555, filed Apr. 24, 2013; 25 pages.

Advisory Action dated Dec. 11, 2020; U.S. Appl. No. 13/869,555, filed Apr. 24, 2013; 4 pages.

Office Action dated Feb. 1, 2021; U.S. Appl. No. 13/869,555, filed Apr. 24, 2013; 16 pages.

Final Office Action dated May 3, 2021; U.S. Appl. No. 13/869,555, filed Apr. 24, 2013; 21 pages.

Advisory Action dated Jul. 28, 2021; U.S. Appl. No. 13/869,555, filed Apr. 24, 2013; 20 pages.

Notice of Allowance dated Mar. 21, 2023; U.S. Appl. No. 13/869,555, filed Apr. 24, 2013; 13 pages.

Canadian Office Action; Application No. 2,849,613; Apr. 30, 2020; 3 pages.

Canadian Office Action; Application No. 2,849,613; Jan. 22, 2021; 3 pages.

European Examination Report; Application No. 13165237.2; Apr. 10, 2018; 6 pages.

European Examination Report; Application No. 13165237.2; Oct. 16, 2018; 4 pages.

European Examination Report; Application No. 13165237.2; Jan. 31, 2019; 5 pages.

* cited by examiner

UPDATING AN APPLICATION AT A SECOND DEVICE BASED ON RECEIVED USER INPUT AT A FIRST DEVICE

CROSS-REFERENCE TO RELATED APPLICATIONS

This application is a continuation of U.S. patent application Ser. No. 13/869,555 filed Apr. 24, 2013 by Mathias Lewin, et al. entitled, "Updating an Application at a Second Device Based on Received User Input at a First Device", which is incorporated by reference herein as if reproduced in its entirety.

TECHNICAL FIELD

The embodiments disclosed herein relate to a device, system and method for generating display data.

BACKGROUND

Mobile electronic devices, such as smartphones or tablet computers, may be configured to output a grid of live thumbnails or 'active tiles' which are representative of activities and/or content of 'running applications'.

BRIEF DESCRIPTION OF THE DRAWINGS

The present disclosure and the embodiments set out herein can be better understood with reference to the description of the embodiments set out below, in conjunction with the appended drawings in which.

DESCRIPTION

Figure 1:
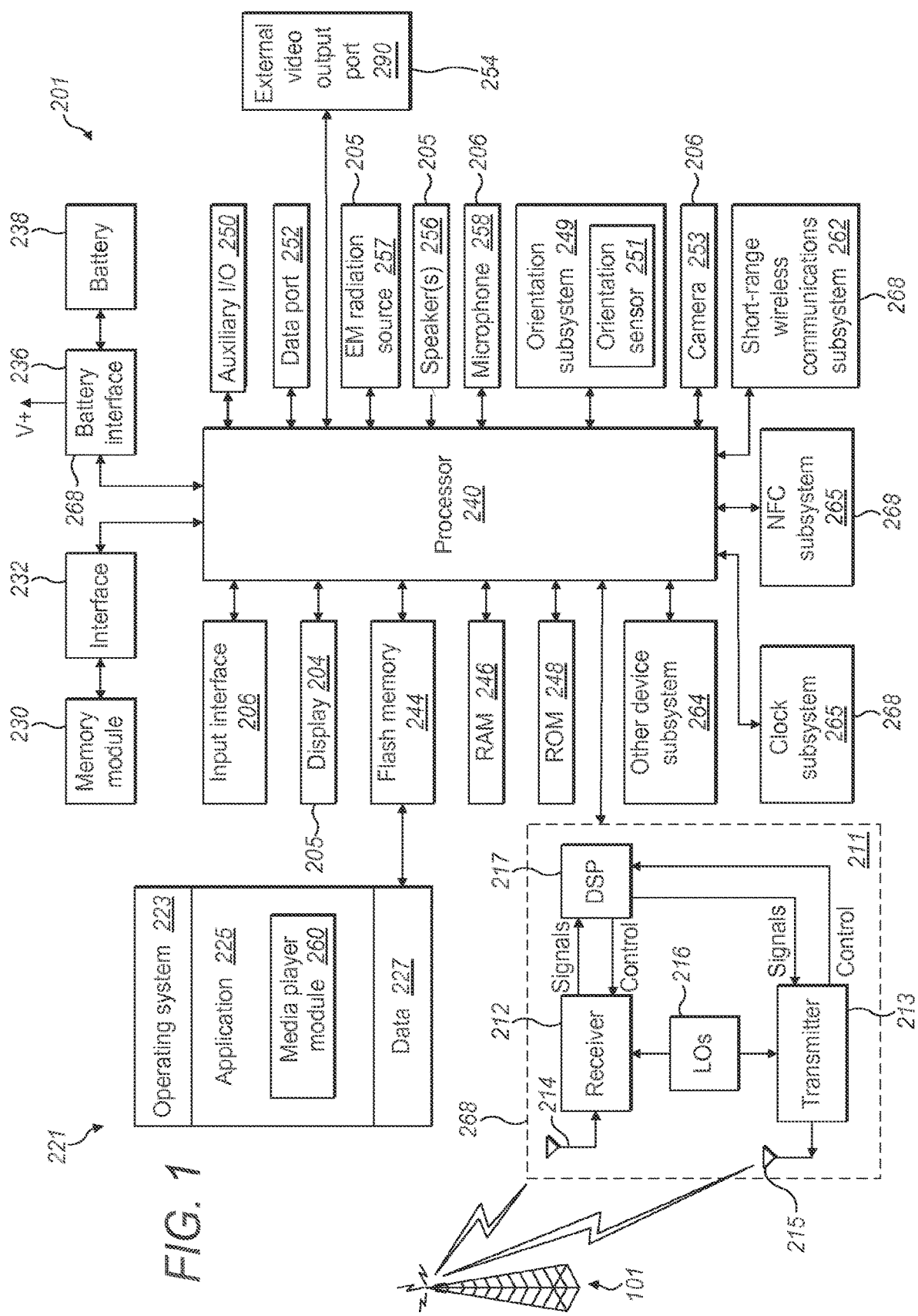
FIG. 1 is a schematic diagram illustrating components of an exemplary electronic device usable by a user in some embodiments.

This disclosure below is a description of one or more exemplary embodiments which are not intended to be limiting on the scope of the appended claims.

In a first aspect, there is provided a method for generating a display object. The method comprises operating a first processor comprised within a first device to execute an application; generate a display object associated with the application; transmit the display object to a second device for output by the second device; and receive user input to the application via the display object output on the second device, wherein the first processor is not operable to receive user input to the application via the display object on the first device. A user is therefore able to interact with an application being executed on a first device via a display object output by a second device. For example, the user may input commands and/or data to an application being executed by the processor of the first device. The method may further comprise operating the first processor to: execute the application in accordance with a user input received via the display object on the second device.

Additionally or alternatively, the method may comprise operating the first processor to update the display object in accordance with the received user input. For example, the user input received via the display object may comprise data and the first processor may supply, or write, the data to the application or memory associated with the application.

The first processor may additionally output the display object on the first device. For example, the first device may display the display object on a display screen of the first device. The display object output on the first device may be a read-only display object associated with the application.

The second device may output the display object by displaying it on a display. For example, the second device may display the display object on a display screen of the second device and/or any other display that is coupled (via any suitable wired or wireless connection) with the second device.

The first processor may be configured to modify the display object prior to its transmission to the second device for display. The first processor may, for example, modify the format and/or one or more characteristics or parameters of the display object in accordance with requirements or characteristics of the second device. For example, the first processor may modify the display object in accordance with requirements of an operating system and/or display paradigm of the second device.

In one example, the display object is a data object and the method further comprises the first processor rendering the display object for output on the first device; and a second processor comprised within the second device rendering the display object for output on the second device.

The method may further comprise causing a second processor comprised within the second device to: generate a second display object representative of data stored on the second device; and output the second display object on the second device; wherein moving the second display object to an area of the second device on which the display object is output causes the first processor to supply the data represented by the second display object to the application. In this manner a user may conveniently supply data stored on, or accessible by, the second device to an application being executed on the first device. For example, 'drag and drop' data stored on the second device onto the second display object and in response to this action, the data is supplied by the first processor to the application.

The display object output on the second device and/or the display object output on the first device (which may be a read-only display object) may, for example, be representative of a Graphical User Interface associated with the application. Similarly, the display object output on the second device and/or the display object output on the first device may additionally or alternatively be representative or indicative of a current status of the application.

In one example, the application executed by the first processor is a calendar application and the display object output on the second device is configured to receive a user input of a calendar appointment on the second device. As discussed above, the calendar appointment may, for example, be input to the application by 'dragging and dropping' an appointment stored on the second device onto the second display object. Additionally or alternatively, the user may input the calendar appointment via the display object by any other suitable means.

The first device may be a mobile device and/or the second device may be a personal computer.

In a second aspect, a computer-readable medium comprises executable instructions which, when executed, cause a processor to perform any of the above-described methods.

In a third aspect, an electronic device comprises processing circuitry configured to perform any of the above-described methods.

In a fourth aspect, an electronic device for generating display objects comprises a first processor configured to: execute an application; generate a display object associated with the application; transmit the display object to a second device for output by the second device; and receive user input to the application via the display object output on the second device, wherein the first processor is not operable receive user input to the application via the display object on the first device.

The first processor of the electronic device may be further operable to: execute the application in accordance with a user input received via the display object on the second device.

Additionally or alternatively, the first processor of the electronic device may be configured to update the display object in accordance with the received user input. For example, the first processor may be configured to receive, via the display object output on the second device, user input comprising data and to supply, or write, the data to the application or to memory associated with the application.

The first processor of the electronic device may be configured to output the display object on the first device. For example the first device may comprise a display screen and the first processor may be operable to display the display object on the display screen. The display object output on the first device may be a read-only display object associated with the application.

The second device may be configured to display the display object on a display. For example, the second device may be configured to display the display object on a display screen of the second device and/or any other display that is coupled (via any suitable wired or wireless connection) to the second device.

The first processor may be configured to modify the display object prior to its transmission to the second device for display. The first processor may, for example, be configured to modify the format and/or one or more characteristics or parameters of the display object in accordance with requirements or characteristics of the second device. For example, the first processor may be configured to modify the display object in accordance with requirements of an operating system and/or display paradigm of the second device.

In one example, the display object is a data object and the first processor is further configured to render the display object for output on the first device.

The second device may comprise a second processor configured to render the display object for output on the second device.

Additionally or alternatively, the second device may comprise a second processor configured to: generate a second display object representative of data stored on the second device; and output the second display object on the second device; wherein moving the second display object to an area of the second device on which the display object is output causes the first processor to supply the data represented by the second display object to the application.

In one example, the first processor is configured to execute a calendar application and the display object output on the second device is configured to receive a user input of a calendar appointment on the second device. As discussed above, the calendar appointment may, for example, be input to the application by 'dragging and dropping' an appointment stored on the second device onto the second display object. Additionally or alternatively, the user may input the calendar appointment via the display object by any other suitable means.

In a fifth aspect, a system for generating display objects comprises a first electronic device comprising a first processor and a second device comprising a second processor wherein the first processor is configured to: execute an application; generate a display object associated with the application; transmit the display object to a second device for output by the second device; and receive user input to the application via the display object output on the second device, wherein the first processor is not operable receive user input to the application via the display object on the first device.

The second processor may be configured to output the display object by displaying it on a display. The second processor may additionally be configured to render the display object for output on the second device. Additionally or alternatively, the second processor may modify the display object prior to displaying it on the display.

The first processor of the system may be configured, prior to transmitting the display object to the second device, to modify the display object so that it is suitable for display by the second device.

In one example, the second processor is configured to generate a second display object representative of data stored on the second device; and output the second display object on the second device; wherein moving the second display object to an area of the second device on which the display object is output causes the first processor to supply the data represented by the second display object to the application.

Additionally or alternatively, the first and second processors of the system may be configured to perform any of the above-described methods.

Reference is made to FIG. 1 which illustrates an exemplary electronic device 201 which is usable in accordance with the disclosure below. An electronic device 201 such as the electronic device 201 of FIG. 1 is configured to generate a user-controllable interface on a built-in display or on a remote, external display device, or on a built-in display and on a remote, external display device. In the context of this disclosure, the term "remote" means a display screen which is not built-in to the electronic device 201 with which the electronic device 201 communicates via a physical wired connection or via a wireless connection. It will be appreciated that, in other embodiments, some of the features, systems or subsystems of the electronic device 201 discussed below with reference to FIG. 1 may be omitted from electronic devices 201 which are intended to perform solely operations in relation to the generation and output of display data and the modification of media content output.

In the illustrated exemplary embodiment, the electronic device 201 is a communication device and, more particularly, is a mobile communication device having data and voice communication capabilities, and the capability to communicate with other computer systems; for example, via the Internet. It will be appreciated that the electronic device 201 may take other forms, including any one of the forms listed below. Depending on the functionality provided by the electronic device 201, in certain exemplary embodiments, the electronic device 201 is a multiple-mode communication device configured for both data and voice communication, a mobile telephone, such as a smartphone, a wearable computer such as a watch, a tablet computer, a personal digital assistant (PDA), or a computer system such as a notebook, laptop or desktop system. The electronic device 201 may take other forms apart from those specifically listed above. The electronic device 201 may also be referred to as a mobile communications device, a communication device, a mobile device and, in some cases, as a device. In the context of this disclosure, the term "mobile" means the device is of a size or weight which makes it readily portable by a single individual, e.g. of a weight less than 5, 4, 3, 2, 1, 0.5, 0.4, 0.3, 0.2 or 0.1 kilograms, or of a volume less than 15,000, 10,000, 5,000, 4,000, 3,000, 2,000, 1,000, 500, 400, 300, 200, 100, 90, 80, 70, 60, 50, 40, 30, 20, 10 or 5 cubic centimetres. As such, the device 201 may be portable in a bag, or clothing pocket.

The electronic device 201 includes a controller including a processor 240 (such as a microprocessor) which controls the operation of the electronic device 201. In certain electronic devices, more than one processor is provided, with each processor in communication with each other and configured to perform operations in parallel, so that they together control the overall operation of the electronic device. The processor 240 interacts with device subsystems, such as a wireless communication subsystem 211 for exchanging radio frequency signals with a wireless network 101 to perform communication functions. The processor 240 is communicably coupled with additional device subsystems including one or more output interfaces 205 (such as one or more of: a display 204, a speaker 256, electromagnetic (EM) radiation source 257), one or more input interfaces 206 (such as one or more of: a camera 253, microphone 258, keyboard (not shown), control buttons (not shown), a navigational input device (not shown), a touch-sensitive overlay (not shown)) associated with a touchscreen 204, an orientation subsystem 249, memory (such as flash memory 244, random access memory (RAM) 246, read only memory (ROM) 248, etc.), auxiliary input/output (I/O) subsystems 250, a data port 252 (which may be a serial data port, such as a Universal Serial Bus (USB) data port), an external video output port 254, a near field communications (NFC) subsystem 265, a short-range communication subsystem 262, a clock subsystem 266, a battery interface 236, and other device subsystems generally designated as 264. Some of the subsystems shown in FIG. 1 perform communication-related functions, whereas other subsystems may provide "resident" or on-device functions.

The electronic device 201 stores data 227 in an erasable persistent memory, which in one exemplary embodiment is the flash memory 244. In various exemplary embodiments, the data 227 includes service data including information used by the electronic device 201 to establish and maintain communication with the wireless network 101. The data 227 may also include user application data such as email messages, address book and contact information, calendar and schedule information, notepad documents, presentation documents and information, word processor documents and information, spread sheet documents and information; desktop publishing documents and information, database files and information; image files, video files, audio files, internet web pages, and other commonly stored user information stored on the electronic device 201 by its user, and other data. The data may also include program application data such as functions, controls and interfaces from an application such as an email application, an address book application, a calendar application, a notepad application, a presentation application, a word processor application, a spread sheet application, a desktop publishing application, a database application, a media application such as a picture viewer, a video player or an audio player, and a web browser. The data 227 stored in the persistent memory (e.g. flash memory 244) of the electronic device 201 may be organized, at least partially, into one or more databases or data stores. The databases or data stores may contain data items of the same data type or associated with the same application. For example, email messages, contact records, and task items may be stored in individual databases within the device memory.

The electronic device 201 includes a clock subsystem or module 266 comprising a system clock configured to measure system time. In one example, the system clock comprises its own alternate power source. The system clock provides an indicator of a current time value, the system time, represented as a year/month/day/hour/minute/second/milliseconds value. In other examples, the clock subsystem 266 additionally or alternatively provides an indicator of the current time value represented as a count of the number of ticks of known duration since a particular epoch.

The clock subsystem 266, the communication subsystem 211, the NFC subsystem, 265, the short-range wireless communications subsystem 262, and the battery interface 236 together form a status report subsystem 268 which is configured to provide an indicator of the operating status of the device 201.

The display 204 receives display data generated by the processor 240, such that the display 204 displays certain application data stored as a segment of the data 227 from the memory (any of the flash memory 244, random access memory (RAM) 246, read only memory (ROM) 248) in a predetermined way on display screen (not shown) of the display 204, according to the processing performed by the processor 240.

In certain exemplary embodiments, the external video output port 254 is integrated with the data port 252. The external video output port 254 is configured to connect the electronic device 201 via a wired connection (e.g. video graphics array (VGA), digital visual interface (DVI) or high definition multimedia interface (HDMI)) to an external (or remote) display device 290 which is separate and remote from the electronic device 201 and its display 204. The processor 240 outputs external display data generated by the processor 240 via the external video output port 254, such that the external display device 290 can display application data from the memory module in a predetermined way on an external display screen (not shown) of the external display device 290. The processor 240 may also communicate the external display data to the external display device 290 in a similar fashion over a wireless communications path.

At any given time, the display data and the external display data generated by the processor 240 may be identical or similar for a predetermined period of time, but may also differ for a predetermined period of time, with the processor 240 controlling whether the display data and the external display data are identical or differ based on input from one or more of the input interfaces 206. In this context, the word "identical" means that both sets of data comprise similar content so as to generate an identical or substantially similar display at substantially the same time on both the external display device 290 and the display 204. In this context, the word "differ" means that the external display data and display data are not identical; this is to say that these data may (but not necessarily) include identical elements of data, for example representative of the same application data, but the external display data and display data are not wholly identical. Hence, the display on both the external display device 290 and the display 204 are not wholly identical, although similar or identical individual items of content based on the application data may be displayed on both the external display device 290 and the display 204.

In at least some exemplary embodiments, the electronic device 201 includes a touchscreen which acts as both an input interface 206 (e.g. touch-sensitive overlay) and an output interface 205 (i.e. display). The touchscreen may be constructed using a touch-sensitive input surface which is connected to an electronic controller and which overlays the display 204. The touch-sensitive overlay and the electronic controller provide a touch-sensitive input interface 206 and the processor 240 interacts with the touch-sensitive overlay via the electronic controller.

The processor 240 is in communication with the memory and the touch-sensitive input interface 206 to detect user input via the input interface 206. The processor 240 then generates or updates display data comprising a display object for display by the display device 204 in accordance with the user input. The processor 240 then outputs the display data for display on the display device 204. In an example, the user input comprises a swipe gesture across the touchscreen interface 206.

In at least some exemplary embodiments, the touch-sensitive overlay has a touch-sensitive input surface which is larger than the display 204. For example, in at least some exemplary embodiments, the touch-sensitive overlay may extend overtop of a frame (not shown) which surrounds the display 204. In such exemplary embodiments, the frame (not shown) may be referred to as an active frame since it is capable of acting as an input interface 206. In at least some exemplary embodiments, the touch-sensitive overlay may extend to the sides of the electronic device 201.

As noted above, in some exemplary embodiments, the electronic device 201 includes a communication subsystem 211 which allows the electronic device 201 to communicate over a wireless network 101. The communication subsystem 211 includes a receiver 212, a transmitter 213, and associated components, such as one or more antenna elements 214 and 215, local oscillators (LOs) 216, and a processing module such as a digital signal processor (DSP) 217 which is in communication with the processor 240. The antenna elements 214 and 215 may be embedded or internal to the electronic device 201 and a single antenna may be shared by both receiver and transmitter. The particular design of the wireless communication subsystem 211 depends on the wireless network 101 in which electronic device 201 is intended to operate.

In at least some exemplary embodiments, the electronic device 201 communicates with any one of a plurality of fixed transceiver base stations of the wireless network 101 within its geographic coverage area. The electronic device 201 may send and receive communication signals over the wireless network 101 after the required network registration or activation procedures have been completed. Signals received by the antenna 214 through the wireless network 101 are input to the receiver 212, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 217. In a similar manner, signals to be transmitted are processed, including modulation and encoding, for example, by the DSP 217. These DSP-processed signals are input to the transmitter 213 for digital-to-analog (D/A) conversion, frequency up conversion, filtering, amplification, and transmission to the wireless network 101 via the antenna 215. The DSP 217 not only processes communication signals, but may also provide for receiver and transmitter control. For example, the gains applied to communication signals in the receiver 212 and the transmitter 213 may be adaptively controlled through automatic gain control algorithms implemented in the DSP 217.

In some exemplary embodiments, the auxiliary input/output (I/O) subsystems 250 include an external communication link or interface; for example, an Ethernet connection. The electronic device 201 may include other wireless communication interfaces for communicating with other types of wireless networks; for example, a wireless network such as an orthogonal frequency division multiplexed (OFDM) network. The auxiliary I/O subsystems 250 may include a vibrator for providing vibratory notifications in response to various events on the electronic device 201 such as receipt of an electronic communication or incoming phone call, or for other purposes such as haptic feedback (touch feedback).

In some exemplary embodiments, the electronic device 201 also includes a removable memory module 230 (typically including flash memory, such as a removable memory card) and a memory interface 232. Network access may be associated with a subscriber or user of the electronic device 201 via the memory module 230, which may be a Subscriber Identity Module (SIM) card for use in a GSM network or other type of memory card for use in the relevant wireless network type. The memory module 230 is inserted in or connected to the memory card interface 232 of the electronic device 201 in order to operate in conjunction with the wireless network 101.

The data port 252 may be used for synchronization with a user's host computer system (not shown). The data port 252 enables a user to set preferences through an external device or software application and extends the capabilities of the electronic device 201 by providing for information or software downloads to the electronic device 201 other than through the wireless network 101. The alternate download path may for example, be used to load an encryption key onto the electronic device 201 through a direct, reliable and trusted connection to thereby provide secure device communication.

In at least some exemplary embodiments, the electronic device 201 also includes a device orientation subsystem 249 including at least one orientation sensor 251 which is connected to the processor 240 and which is controlled by one or a combination of a monitoring circuit and operating software. The orientation sensor 251 detects the orientation of the device 201 or information from which the orientation of the device 201 can be determined, such as acceleration. In some exemplary embodiments, the orientation sensor 251 is an accelerometer, such as a three-axis accelerometer. An accelerometer is a sensor which converts acceleration from motion (e.g. movement of the device 201 or a portion thereof due to the strike force) and gravity which are detected by a sensing element into an electrical signal (producing a corresponding change in output). Accelerometers may be available in one, two or three axis configurations. Higher order axis configurations are also possible. Accelerometers may produce digital or analog output signals depending on the type of accelerometer.

An orientation sensor 251 may generate orientation data which specifies the orientation of the electronic device 201. The orientation data, in at least some exemplary embodiments, specifies the orientation of the device 201 relative to the gravitational field of the earth. Additionally or alternatively, the orientation sensor 251 may generate orientation data which specifies the orientation of the device relative to known locations or fixtures in a communication network.

In some exemplary embodiments, the orientation subsystem 249 includes other orientation sensors 251, instead of or in addition to accelerometers. For example, in various exemplary embodiments, the orientation subsystem 249 may include a gravity sensor, a gyroscope, a tilt sensor, an electronic compass or other suitable sensor, or combinations thereof. In some exemplary embodiments, the device orientation subsystem 249 may include two or more orientation sensors 251 such as an accelerometer and an electronic compass.

The electronic device 201, in at least some exemplary embodiments, includes a Near-Field Communication (NFC) subsystem 265. The NFC subsystem 265 is configured to communicate with other electronic devices 201 or tags, using an NFC communications protocol. NFC is a set of short-range wireless technologies which typically require a distance of 4 cm or less for communications. The NFC subsystem 265 may include an NFC chip and an NFC antenna. In such an embodiment, the orientation sensor 251 may generate data which specifies a distance between the electronic device 201 and an NFC transceiver.

The electronic device 201 includes a microphone or one or more speakers. In at least some exemplary embodiments, an electronic device 201 includes a plurality of speakers 256. For example, in some exemplary embodiments, the electronic device 201 includes two or more speakers 256. The two or more speakers 256 may, for example, be disposed in spaced relation to one another. That is, in at least some exemplary embodiments, the electronic device 201 may include a first speaker and a second speaker and the first speaker and the second speaker may be spatially separated from one another within the electronic device 201. In at least some exemplary embodiments, the display 204 may be disposed between the first speaker and the second speaker of the electronic device. In such exemplary embodiments, the first speaker may be located at one side of the display 204 and the second speaker may be located at another side of the display which is opposite the side of the display where the first speaker is located. For example, the first speaker may be disposed at a left side of the display and the second speaker may be disposed at a right side of the display.

In at least some exemplary embodiments, each speaker 256 is associated with a separate audio channel. The multiple speakers may, for example, be used to provide stereophonic sound (which may also be referred to as stereo).

The electronic device 201 may also include one or more cameras 253. The one or more cameras 253 may be capable of capturing images in the form of still photographs or motion video.

In at least some exemplary embodiments, the electronic device 201 includes a front facing camera 253. A front facing camera is a camera which is generally located on a front face of the electronic device 201. The front face is typically the face on which a display 204 is mounted. That is, the display 204 is configured to display content which may be viewed from a side of the electronic device 201 where the camera 253 is directed. The front facing camera 253 may be located anywhere on the front surface of the electronic device; for example, the camera 253 may be located above or below the display 204. The camera 253 may be a fixed position camera which is not movable relative to the display 204 of the electronic device 201 or the housing of the electronic device 201. In such exemplary embodiments, the direction of capture of the camera is always predictable relative to the display 204 or the housing. In at least some exemplary embodiments, the camera may be provided in a central location relative to the display 204 to facilitate image acquisition of a face.

In at least some exemplary embodiments, the electronic device 201 includes an electromagnetic (EM) radiation source 257. In at least some exemplary embodiments, the EM radiation source 257 is configured to emit electromagnetic radiation from the side of the electronic device which is associated with a camera 253 of that electronic device 201. For example, where the camera is a front facing camera 253, the electronic device 201 may be configured to emit electromagnetic radiation from the front face of the electronic device 201. That is, in at least some exemplary embodiments, the electromagnetic radiation source 257 is configured to emit radiation in a direction which may visible by the camera. That is, the camera 253 and the electromagnetic radiation source 257 may be disposed on the electronic device 201 so that electromagnetic radiation emitted by the electromagnetic radiation source 257 is visible in images detected by the camera.

In some exemplary embodiments, the electromagnetic radiation source 257 is an infrared (IR) radiation source which is configured to emit infrared radiation. In at least some exemplary embodiments, the electromagnetic radiation source 257 may be configured to emit radiation which is not part of the visible spectrum. The camera 253 may be a camera which is configured to capture radiation of the type emitted by the electromagnetic radiation source 257. Accordingly, in at least some exemplary embodiments, the camera 253 is configured to capture at least some electromagnetic radiation which is not in the visible spectrum.

In some exemplary embodiments, the electronic device 201 is provided with a service routing application programming interface (API) which provides an application with the ability to route traffic through a serial data (i.e., USB) or Bluetooth® (Bluetooth® is a registered trademark of Bluetooth SIG, Inc.) connection to a host computer system using standard connectivity protocols. When a user connects their electronic device 201 to the host computer system via a USB cable or Bluetooth® connection, traffic that was destined for the wireless network 101 is automatically routed to the electronic device 201 using the USB cable or Bluetooth® connection. Similarly, any traffic destined for the wireless network 101 is automatically sent over the USB cable Bluetooth® connection to the host computer system for processing.

The electronic device 201 also includes a battery 238 as a power source, which is typically one or more rechargeable batteries that may be charged for example, through charging circuitry coupled to a battery interface 236 such as the data port 252. The battery 238 provides electrical power to at least some of the electrical circuitry in the electronic device 201, and the battery interface 236 provides a mechanical and electrical connection for the battery 238. The battery interface 236 is coupled to a regulator (not shown) which provides power V+ to the circuitry of the electronic device 201.

The electronic device 201 includes a short-range communication subsystem 262 which provides for wireless communication between the electronic device 201 and other electronic devices 201. In at least some exemplary embodiments, the short-range communication subsystem 262 is a wireless bus protocol compliant communication mechanism such as a Bluetooth® communication module to provide for communication with similarly-enabled systems and devices.

Any one or more of the communication subsystem 211, the NFC subsystem 265 and the short-range wireless communications subsystem 262 serves as a "communication subsystem" which is configured to provide an indicator of an incoming message being received by the electronic device 201. The incoming message may be an email, a message received via a social networking website, an SMS (short message service) message, or a telephone call, for example.

The electronic device 201 is, in some exemplary embodiments, a mobile communication device which may provide two principal modes of communication: a data communication mode and a voice communication mode. In the data communication mode, a received data signal such as a text message, an email message, or Web page download will be processed by the communication subsystem 211 and input to the processor 240 for further processing. For example, a downloaded Web page may be further processed by a browser application or an email message may be processed by an email messaging application and output to the display 204. A user of the electronic device 201 can compose data items, such as email messages; for example, using the input devices in conjunction with the display 204. These composed items may be transmitted through the communication subsystem 211 over the wireless network 101.

In the voice communication mode, the electronic device 201 provides telephony functions and operates as a typical cellular phone. The overall operation is similar, except that the received signals would be output to the speaker 256 and signals for transmission would be generated by a transducer such as the microphone 258. The telephony functions are provided by a combination of software/firmware (i.e., a voice communication module) and hardware (i.e., the microphone 258, the speaker 256 and input interfaces 206). Alternative voice or audio I/O subsystems, such as a voice message recording subsystem, may also be implemented on the electronic device 201. Although voice or audio signal output is typically accomplished primarily through the speaker 256, the display screen 204 may also be used to provide an indication of the identity of a calling party, duration of a voice call, or other voice call related information.

The processor 240 operates under stored program control and executes software modules 221 stored in memory such as persistent memory; for example, in the flash memory 244. As illustrated in FIG. 1, the software modules 221 include operating system software 223 and other software applications 225 such as a media player module 260. In the exemplary embodiment of FIG. 1, the media player module 260 is implemented as a stand-alone application 225. However, in other exemplary embodiments, the presentation module 260 could be implemented as part of the operating system 223 or other applications 225.

As discussed above, electronic devices 201 which are configured to perform operations in relation to a communications log may take a variety of forms. In at least some exemplary embodiments, one or more of the electronic devices which are configured to perform operations in relation to the presentation module 260 are a smart phone or a tablet computer.

Figure 2:
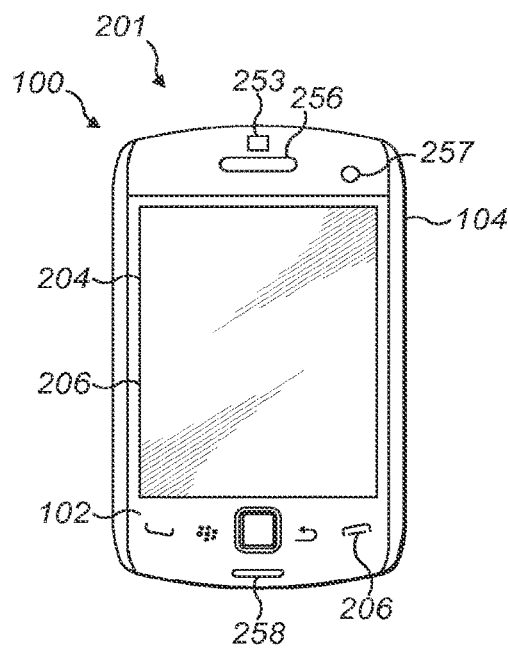
FIG. 2 is a plan view of the upper external side of an alternative exemplary electronic device usable by an end-user in some embodiments.

Referring now to FIG. 2, a front view of an exemplary electronic device 201 which in one example may be a mobile device 100 is illustrated. The mobile device 100 may, for example, be a smartphone, which is a mobile phone that offers more advanced computing capability than a basic cellular phone. For example, the mobile device 100 may have the ability to run third party applications which are stored thereon.

The mobile device 100 includes all of the components discussed above with reference to FIG. 1, or a subset of those components. The mobile device 100 includes a housing 104 which houses at least some of the components discussed above with reference to FIG. 1.

In the exemplary embodiment, the mobile device 100 includes a display 204, which may be a touchscreen which acts as an input interface 206. The display 204 is disposed within the mobile device 100 so that it is viewable at a front side 102 of the mobile device 100. That is, a viewable side of the display 204 is disposed on the front side 102 of the mobile device 100. In the exemplary embodiment illustrated, the display 204 is framed by the housing 104.

The example mobile device 100 also includes other input interfaces 206 such as one or more buttons, keys or navigational input mechanisms. In the example illustrated, at least some of these additional input interfaces 206 are disposed for actuation at a front side 102 of the mobile device.

The example mobile device 100 also includes a speaker 256. In the exemplary embodiment illustrated, the mobile device includes a single speaker 256 which is disposed vertically above the display 204 when the mobile device 100 is held in a portrait orientation where its height is longer than its width. The speaker 256 may be disposed on the front face of the mobile device 100.

While the example mobile device 100 of FIG. 2 includes a single speaker 256, in other exemplary embodiments, the mobile device 100 may include a greater number of speakers 256. For example, in at least some exemplary embodiments, the mobile device 100 may include a second speaker 256 which is disposed vertically below the display 204 when the mobile device 100 is held in a portrait orientation where its height is longer than its width (i.e. the orientation illustrated in FIG. 2).

The example mobile device 100 also includes a microphone 258. In the example illustrated, the microphone 258 is vertically disposed below the display 204 when the mobile device is held in the portrait orientation. The microphone 258 and at least one speaker 256 may be arranged so that the microphone is in close proximity to a user's mouth and the speaker 256 is in close proximity to a user's ear when the user holds the phone to their face to converse on the mobile device.

The example mobile device 100 also includes a front facing camera 253 which may be located vertically above the display 204 when the mobile device 100 is held in a portrait orientation where its height is longer than its width. The front facing camera 253 is located so that it may capture images of objects which are located in front of or surrounding the front side of the mobile device 100.

The example mobile device 100 also includes an electromagnetic radiation source 257. The electromagnetic radiation source 257 is disposed on the front side 102 of the mobile device 100. In this orientation, electromagnetic radiation which is produced by the electromagnetic radiation source 257 may be projected onto objects which are located in front of or surrounding the front side of the mobile device 100. Such electromagnetic radiation (or the projection of electromagnetic radiation onto objects) may be captured on images detected by the camera 253.

Figure 3:
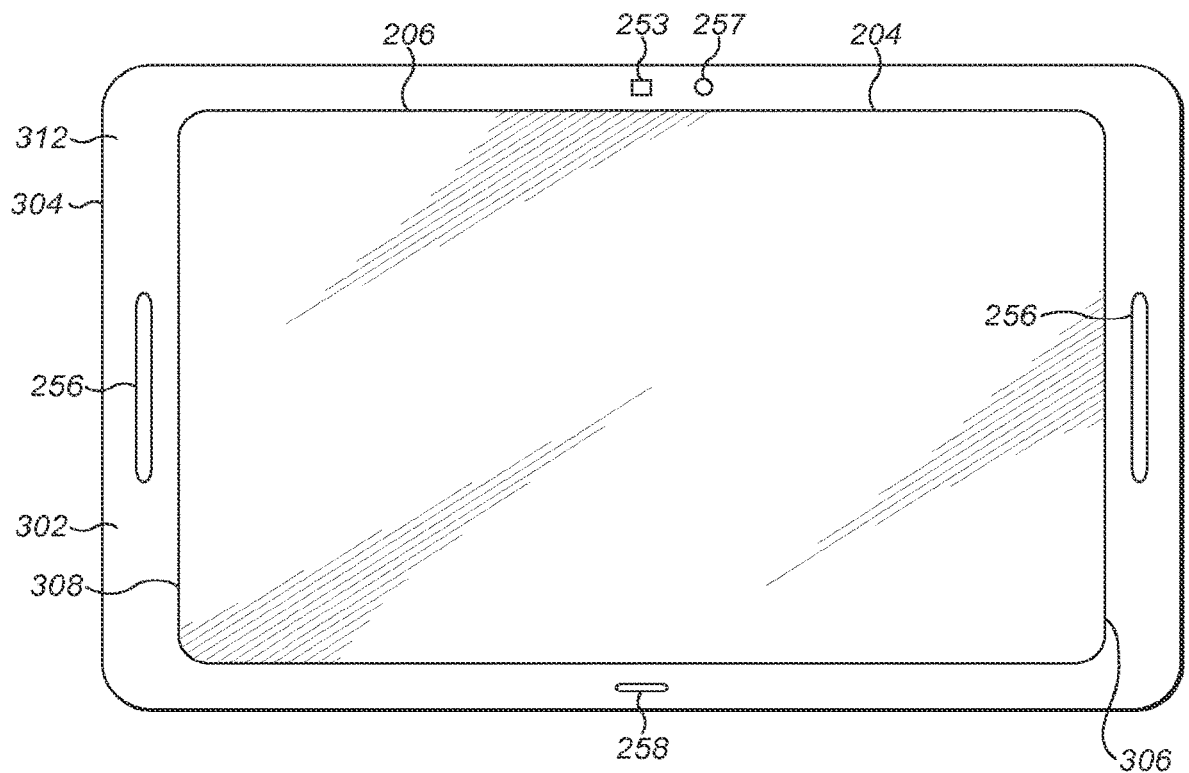
FIG. 3 is a plan view of the upper external side of one alternative exemplary electronic device usable by an end-user in some embodiments.

Referring now to FIG. 3, a front view of an alternative electronic device 201, which in one example may be a tablet computer 300, is illustrated. The tablet computer 300 may include the components discussed above with reference to FIG. 1 or a subset of those components. The tablet computer 300 includes a housing 304 which houses at least some of the components discussed above with reference to FIG. 1.

The tablet computer 300 includes a display 204, which may be a touchscreen which acts as an input interface 206. The display 204 is disposed within the tablet computer 300 so that it is viewable at a front side 302 of the tablet computer 300. That is, a viewable side of the display 204 is disposed on the front side 302 of the tablet computer 300. In the exemplary embodiment illustrated, the display 204 is framed by the housing 304.

A frame 312 surrounds the display 204. The frame 312 is portion of the housing 304 which provides a border around the display 204. In at least some exemplary embodiments, the frame 312 is an active frame 312. That is, the frame has a touch sensitive overlay which allows the electronic device 201 to detect a touch applied to the frame thus allowing the frame 312 to act as an input interface 206 (FIG. 1).

The exemplary tablet computer 300 includes a plurality of speakers 256. In the exemplary embodiment illustrated, the tablet includes two speakers 256. The two speakers 256 are disposed on opposing sides of the display 204. More particularly, when the tablet computer 300 is held in a landscape orientation (such as the orientation illustrated in FIG. 3) where its width is longer than its height, one of the two speakers is disposed on a right side 306 of the display 204 and one of the speakers is disposed on the left side 308 of the display 204.

Both speakers 256 are disposed on the front side 302 of the tablet computer 300.

The exemplary tablet computer 300 also includes a microphone 258. In the example illustrated, the microphone 258 is vertically disposed below the display 204 when the tablet computer is held in the landscape orientation illustrated in FIG. 3. The microphone 258 may be located in other locations in other exemplary embodiments.

The exemplary tablet computer 300 also includes a front facing camera 253 which may be located vertically above the display 204 when the tablet computer 300 is held in a landscape orientation (i.e. the orientation of FIG. 3). The front facing camera 253 is located so that it may capture images of objects which are located in front of or surrounding the front side of the tablet computer 300.

The example tablet computer 300 also includes an electromagnetic radiation source 257. The electromagnetic radiation source 257 is disposed on the front side 304 of the tablet computer 300. In this orientation, electromagnetic radiation which is produced by the electromagnetic radiation source 257 may be projected onto objects which are located in front of or surrounding the front side 302 of the tablet computer 300. Such electromagnetic radiation (or the projection of electromagnetic radiation onto objects) may be captured on images detected by the camera 253.

The tablet computer 300 may have the ability to run third party applications which are stored on the tablet computer.

The electronic device 201, which may be tablet computer 300, is usable by an end-user to send and receive communications using electronic communication services supported by a service provider.

The end-user of an electronic device 201 may send and receive communications with different entities using different electronic communication services. Those services may or may not be accessible using one or more particular electronic devices. For example, a communication source of an end-user's text messages sent and received by an end-user using a particular electronic device 201 having a particular memory module 230, such as a USIM, may be accessible using that device 201, but those text messages may not be accessible using another device having a different memory module. Other electronic communication sources, such as a web-based email account, may be accessible via a web-site using a browser on any internet-enabled electronic device.

Figure 4:
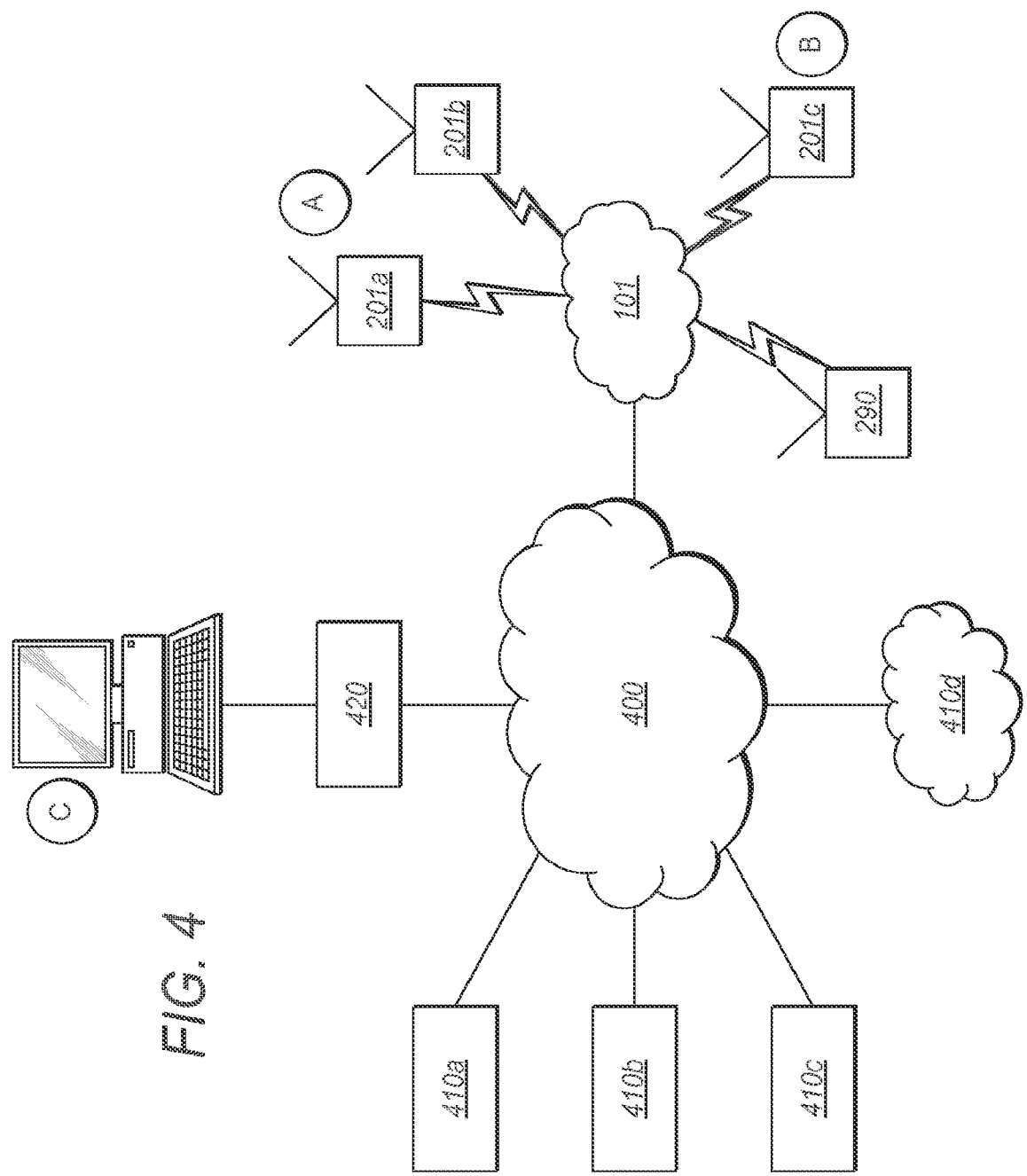
FIG. 4 is a schematic diagram of an exemplary system in which the aforementioned electronic devices can be employed in some exemplary embodiments.

FIG. 4 shows a system of networked apparatus by which electronic communications can be sent and received using multiple electronic devices 201a, 201b, 201c. Referring to FIG. 4, electronic devices 201a, 201b and 201c are connected to wireless network 101 to perform voice and data communications, and to transmit data to an external display device 290 residing on the wireless network. Wireless network 101 is also connected to the communications network 400, e.g. Internet. Electronic device 201a may be a tablet computer similar to tablet computer 300 described in FIG. 2 above. Electronic devices 201b and 201c may be smartphones. Electronic device 201d is a computing device such as a notebook, laptop or desktop, or personal computer which is connected by a wired broadband connection to Local Area Network 420, and which is also connected to the communications network 400. Electronic devices 201a, b, c, d may access the communications network 400 to perform data communications therewith.

Servers 410a, 410b, 410c and 410d are also connected to the communications network 400 and one or more of them may individually or together support electronic communications services available to end-users of electronic devices 201a, 201b, 201c and 201d, enabling them to send and receive electronic communications. Servers 410a, 410b, 410c and 410d may be web servers or communications servers, such as email servers. For example, servers 401a-d may be part of a 'cloud' of information servers from which data may be accessed via the network 400.

Other servers and services may of course be provided allowing users of electronic devices 201a, 201b, 201c and 201d to send and receive electronic communications by, for example, Voice over IP phone calls, video IP calls, video chat, group video chat, blogs, file transfers, instant messaging, and feeds.

Wireless network 101 may also support electronic communications without using communications network 400. For example, a user of smart phone 201b may use wireless network 101 to make telephony calls, video calls, send text messages, send multimedia messages, and send instant messages to smart phone 201c, and to display application data on a display screen of the external display device 290, or control the display of application data.

The example shown in FIG. 4 is intended to be non-limiting and additional network infrastructure may of course be provided, such as a Public Switched Telephone Network (not shown), which may be used, for example, to make telephony calls using smartphone 201b to a wired phone (not shown).

Figure 5:
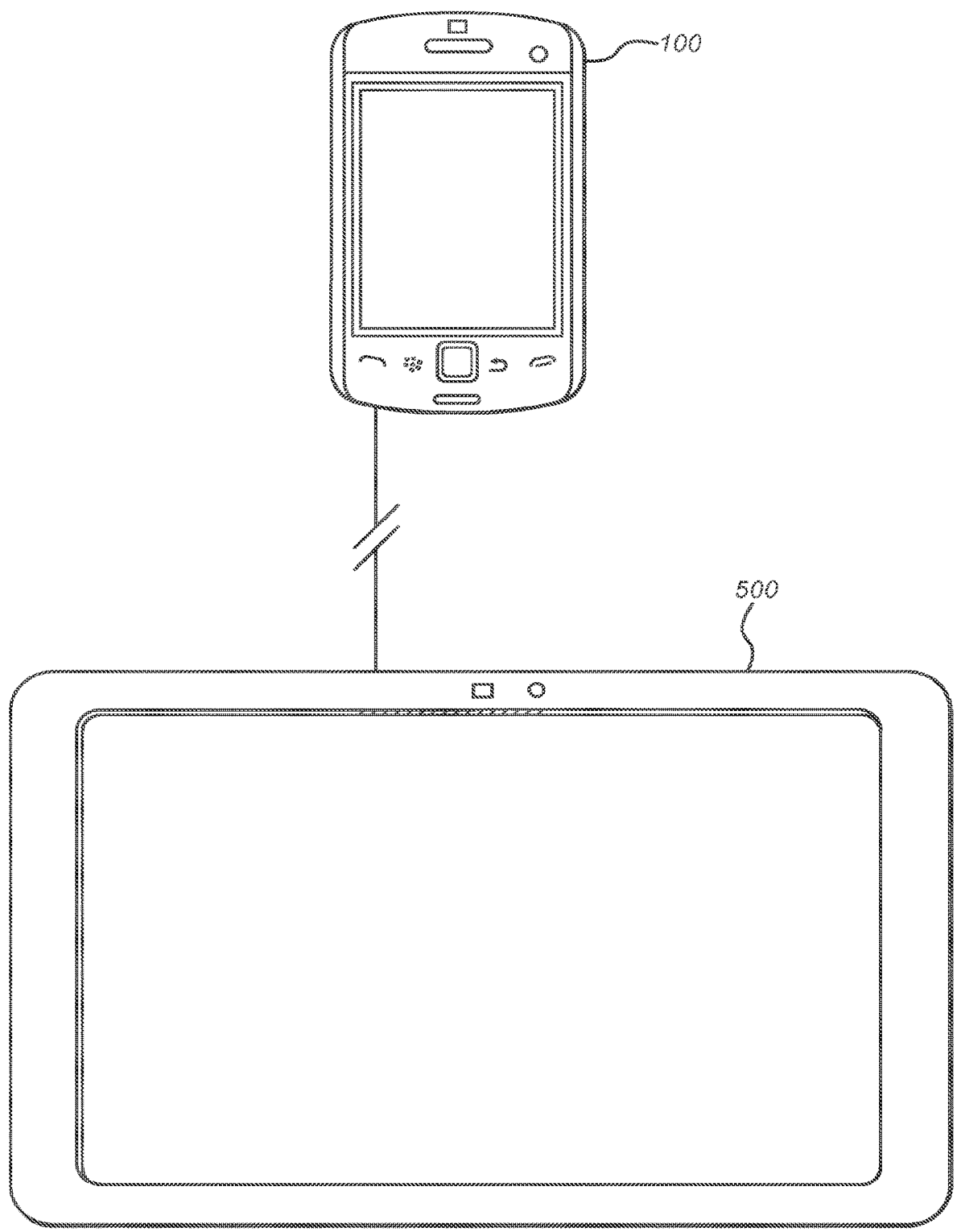
FIG. 5 illustrates a first electronic device in communication with an electronic device.

FIG. 5 shows a first device 100 in communication with a second device 500. In what follows the first device 100 will be referred to as a mobile device 100 and the second device 500 will be referred to as a personal computer. However, it will be appreciated that this is by way of example only and that the first device 100 and/or the second device 500 may alternatively be any suitable electronic device 201, e.g. a mobile device 100, a tablet computer 300, a laptop (portable personal computer, notebook etc.), a desktop computer, etc.

The mobile device 100 and the personal computer 500 may communicate with each other using any suitable wired or wireless connection. The mobile device 100 and the personal computer 500 may operate on the same network which may be wired or wireless and may communicate via this network. The mobile device 100 and the personal computer 500 may additionally or alternatively establish a communication connection via their respective short-range communication subsystems 262. In one embodiment, the short-range communication subsystem 262 is a wireless network protocol compliant communication mechanism such as an ad-hoc or routed WiFi communication mechanism, e.g. 802.11a, b, g or n. In at least some exemplary embodiments, the short-range communication subsystem 262 is a wireless bus protocol compliant communication mechanism such as a Bluetooth® communication module to provide for communication between the two similarly-enabled devices. Alternatively, the mobile device 100 and the personal computer 500 may be connected or 'docked' using a physical connection, such as a USB cable via the auxiliary I/O) subsystems 250, a high-definition multimedia interface, a HDMI connection or any other suitable connection.

In order to explain exemplary modes of operation, reference is made below to FIGS. 6 to 10.

Figure 6:
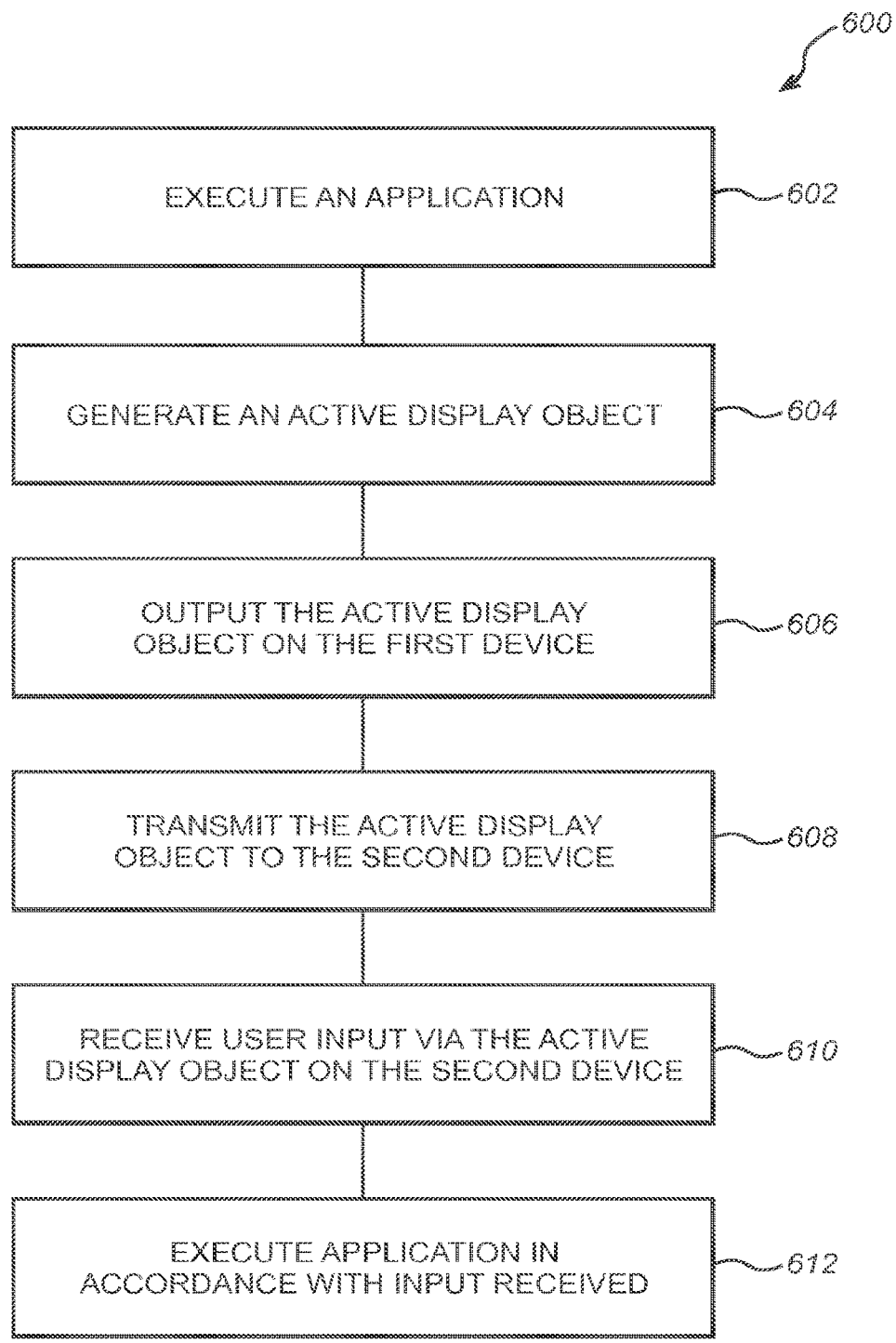
FIG. 6 is a flow diagram showing a method of generating display objects.

FIG. 6 shows a method 600 performed by a processor 240 for generating a display object for output on the display screen 204a of the mobile device 100 and the display screen 204b of the personal computer 500. FIGS. 7A, 7B, 8A and 8B depict the display screens 204a and 204b and the display object 700 that is output by the processor 240 during performance of the method 600.

It will be appreciated that whilst FIGS. 7A, 7B, 8A and 8B depict a single display object 700, multiple display objects 700 may also be output during performance of the method 600. Similarly, a display object 700 may comprise one or more display objects, or elements, which combine to form the display object 700.

At block 602, the processor 240 of the mobile device 100 executes or 'runs' one or more applications or processes stored on, or accessible by, the mobile device 100.

At block 604, the processor 240 of the mobile device 100 generates a display object 700 pertaining to the application being executed by the processor 240. The display object 700 may be referred to as an 'active display object' as it pertains to an application that is currently 'active', e.g. being executed by the processor 240 (in the background or foreground). For example, the display object 700 may be representative of one or more of: a Graphical User Interface (GUI) of the application; a current status or 'context' of the application; and content (or data) associated with the application.

At block 606, the processor 240 outputs an display object 700 on the display screen 204a of the mobile device 100. The display object 700 output on the screen 204a may, for example, be a miniaturised (or reduced size) representation such as a thumbnail image or 'active tile' representation of the application GUI or an icon representation of the application. The processor 240 may output a plurality of such tiles on the display 204a at a given time. During execution of an application, the processor may update an display object 700 pertaining to the application in accordance with a current status of the application. In this manner, the processor 240 provides information about the status of the application whilst also providing information about further display objects output on the screen 204a.

The display object 700 output on the display screen 204a may be a selectable or actionable display object, the selection of which causes the processor 240 to display (or maximise the display of) the application GUI, thereby enabling the user to select or view the application to which the display object 700 pertains. The processor 240 may output a plurality of display objects 700 at a given time, thereby allowing a user to switch between active applications. In this manner, the user can easily select a required one of a plurality of applications being executed by the processor 240.

Figure 7A:
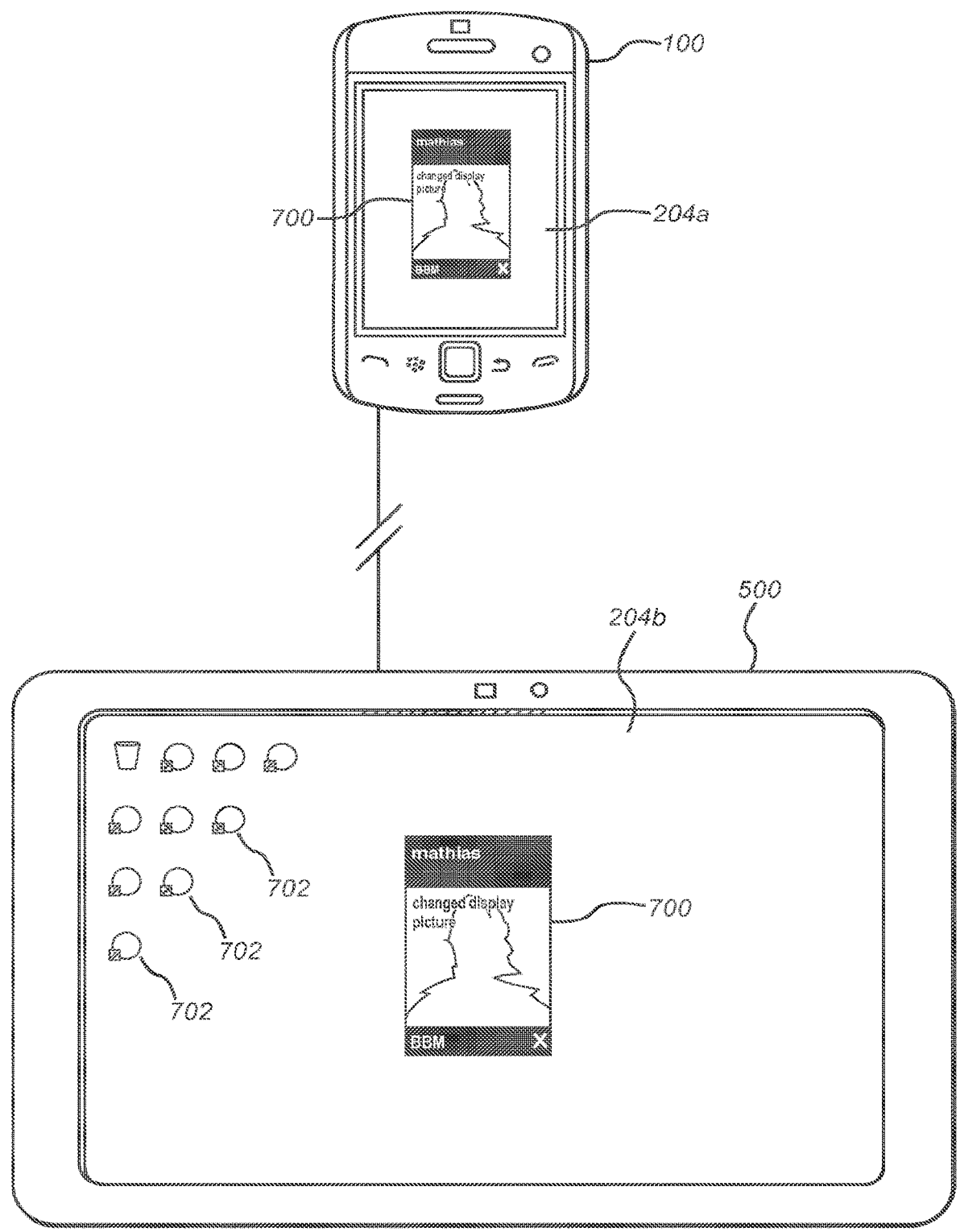
FIGS. 7A and 7B are example displays showing outputs of the generated display objects.
Figure 7B:
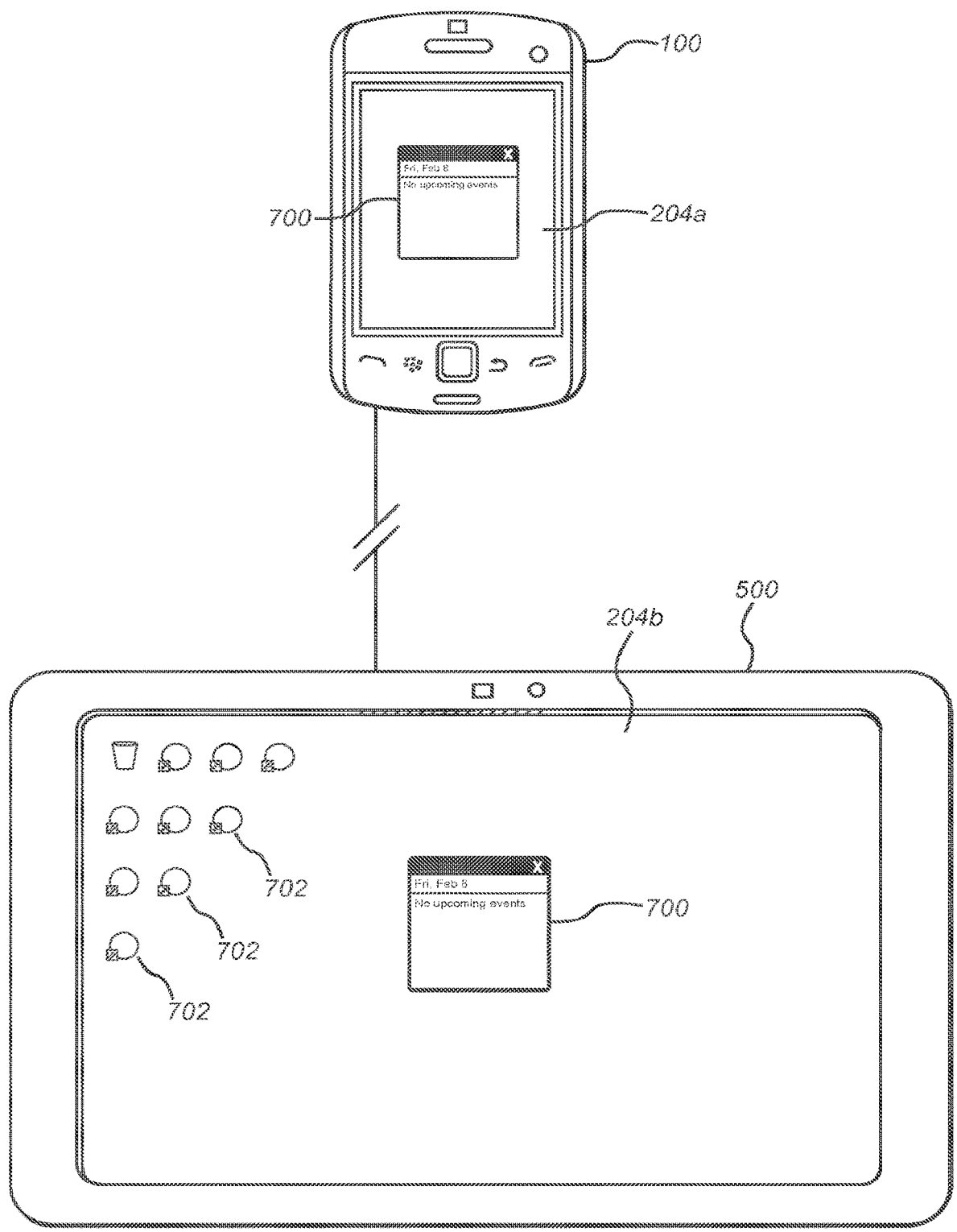
Figure 8A:
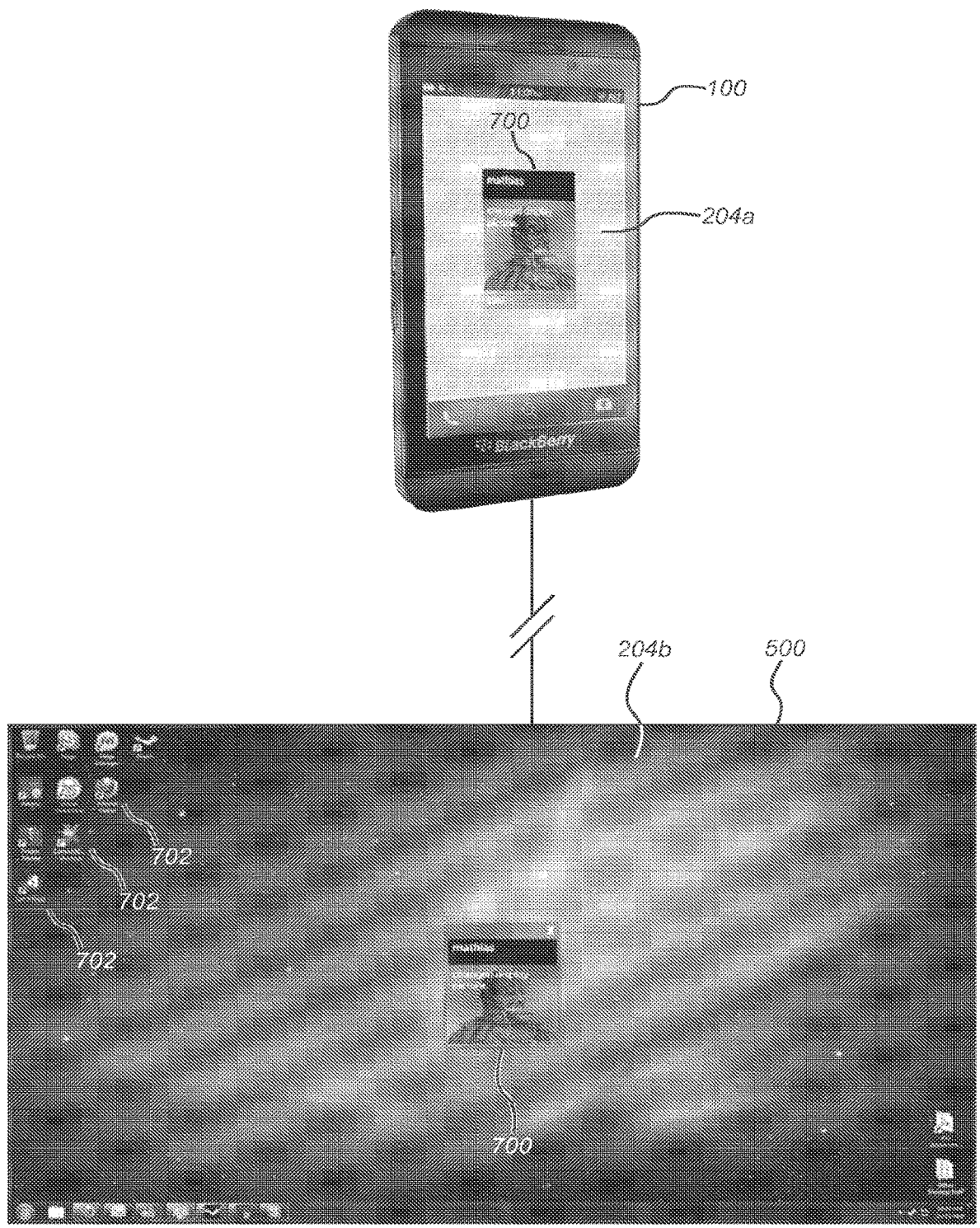
FIGS. 8A and 8B are example displays similar to the displays depicted in FIGS. 7A and 7B.
Figure 8B:
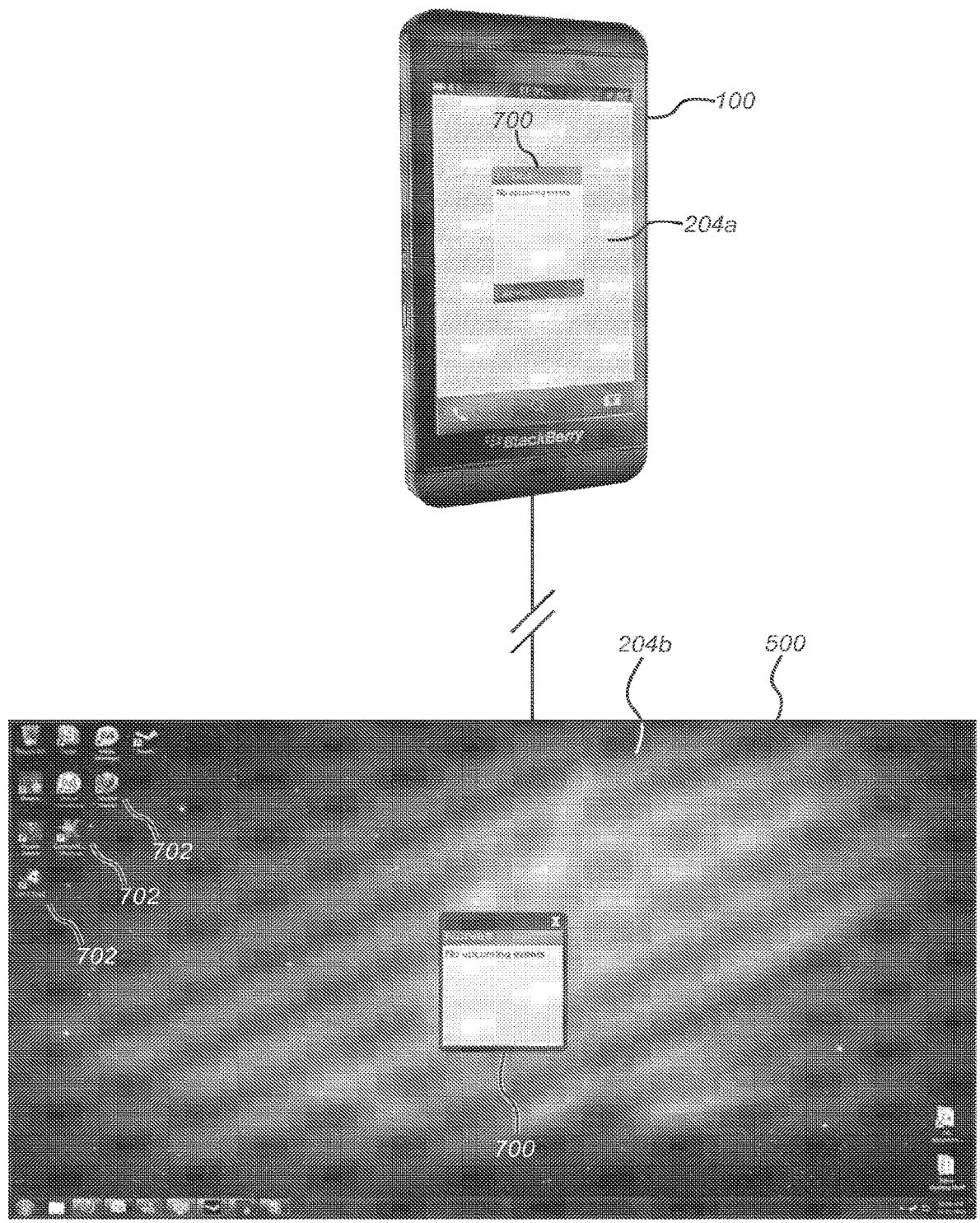

In the exemplary embodiment depicted in FIGS. 7A and 8A, the processor 240 of the mobile device 100 executes a BlackBerry® messenger application and outputs, on the display screen 204a, an display object 700 indicative of information associated with the application. In the exemplary embodiment depicted in FIGS. 7B and 8B, the processor 240 of the mobile device 100 executes a calendar application and outputs, on the display screen 204a, an display object 700 indicative of calendar or appointment information associated with a specific date.

At block 608, the processor 240 transmits or communicates the display object 700 to the personal computer 500 for display on the display screen 204b. The display object 700 transmitted by the processor 240 of the mobile device 100 may comprise a data object (or data structure), in which case the processor of the personal computer 500 renders the data object before outputting it on the display screen 204b. Alternatively, the display object 700 may be rendered by the processor 240 of the mobile device 100 before transmission to the personal computer 500. In this case, the processor of the personal computer 500 may not need to perform further rendering of the data object 700 before outputting it on the display screen 204b.

Transmission and/or rendering of the display object 700 to the personal computer 500 may comprise modifying (e.g.: translating, adapting, converting, moving and/or resizing etc.) the display object 700 so that it is in a suitable format for display on the display screen 204b. In this manner, the display object 700 may be translated to compensate (or adjust) for differences between the display screen 204a of the mobile device 100 and the display screen 204b of the personal computer 500. For example, the display object 700 may be translated to account for the display screen 204b of the personal computer 500 having a different resolution (e.g. as measured by Dots Per Inch (DPI) or Pixels Per Inch (PPI), etc.) to that of the display screen 204a of the mobile device 100. Additionally or alternatively, the display object 700 may be translated so that it matches the host user experience (UX) or user interface (UI) paradigm.

Translation of the display object 700 may be performed by the processor 240 of the mobile device 100. Additionally or alternatively, the translation of the display object 700 may be performed by the processor of the personal computer 500. In this manner, processing can be distributed between the mobile device 100 and the personal computer 500 to optimise the resulting UI and/or UX paradigm.

The display object 700 output on the screen 204b may comprise a widget, control, or charm pertaining to information associated with the application and allowing a user to manipulate, modify, or interact with, the application or data pertaining to the application via the personal computer 500. For example, the display object 700 output on the personal computer 500 may comprise one or more of a window, button, menu, or text box via which user input to the application being executed by the processor 240 of the mobile device 100. In this manner the personal computer 500 and, in particular, the display object 700 output on the screen 204b provide an input interface 206 for the application being executed on the mobile device 100.

Whilst the processor of the personal computer 500 outputs the display object 700, the processor 240 of the mobile device 100 may modify the display object 700 output on the screen 204a so that it is no longer a selectable display object. The processor 240 of the mobile device 100 may instead output the display object 700 so that it is a 'read-only' display object that provides information pertaining to the application but does not provide a means of manipulating or interacting with the application.

In this manner, a user can interact with applications running on a mobile device 100 via a personal computer operating system (OS). Furthermore, by receiving inputs to the application via the display object output on the second device but not the display object output on the mobile device 100, no modification of the application executable code is required.

Additionally or alternatively, whilst the processor of the personal computer 500 outputs the display object 700, the processor 240 of the mobile device 100 may cease output of the display object 700 on the display screen 204a, or simply not output the display object 700 at all. For example, when a connection is established between the mobile device 100 and the personal computer 500, the display screen 204a may be dimmed or deactivated, for example to save power, in which case the display object 700 ceases to be displayed on the display screen 204a, whilst optionally still allowing the user to interact with applications being executed by the processor 240 of the mobile device 100.

In addition to outputting the display object 700, the processor of the personal computer 500 may output one or more further display objects pertaining to data and/or applications stored on, or accessible to the personal computer 500. In the exemplary embodiments of FIGS. 7A, 7B, 8A and 8B, the processor of the personal computer 500 outputs selectable display objects 702 in addition to the display object 700. User selection of a selectable display object 702 causes the processor of the personal computer 500 to execute an application or process to which the selectable display object 702 pertains.

At block 610, the processor 240 of the mobile device 100 receives user input to the application via the display object 700 output on the display screen 204b. The user input may comprise any form of input to, or interaction with, the application to which the display object 700 pertains. For example, the user input may comprise an input of a command associated with the application and/or a character string, image or any other data associated with the application to which the display object 700 pertains.

It will be appreciated that selection of the display object 700 that is output on the display screen 204a is not the same as providing user input to the application via the display object 700 that is output on the display screen 204b. In particular, selection of the display object 700 causes the processor to display (or maximise the display of) the application to which the display object 700 pertains. In this manner, the provision of the display object 700 on the display screen 204a enables the user to easily switch between multiple applications being executed by the processor 240.

On the other hand, providing user input to the application via the display object 700 that is output on the display screen 204b comprises interacting with the application and/or the manner in which the application is executed. For example, the provision of user input may comprise inputting one or more of data, commands and control signals to the processor 240, responsive to which the processor 240 executes the application in accordance with the received input.

Figure 9:
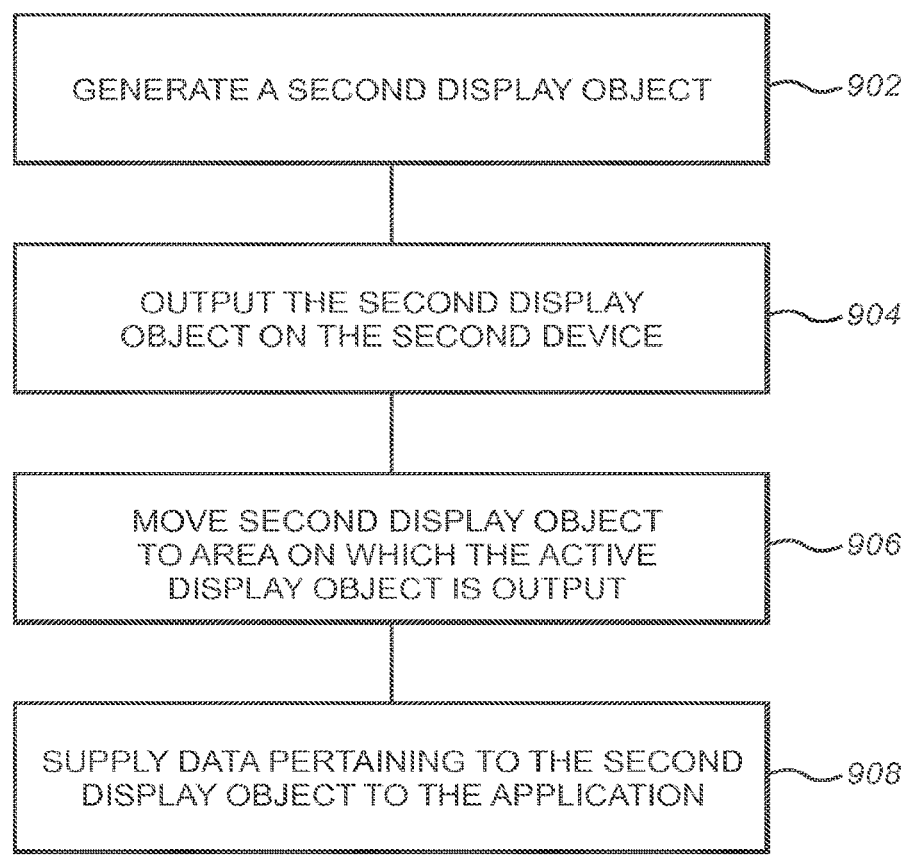
FIG. 9 is a flow diagram showing an exemplary method of receiving user input via an electronic device.
Figure 10:
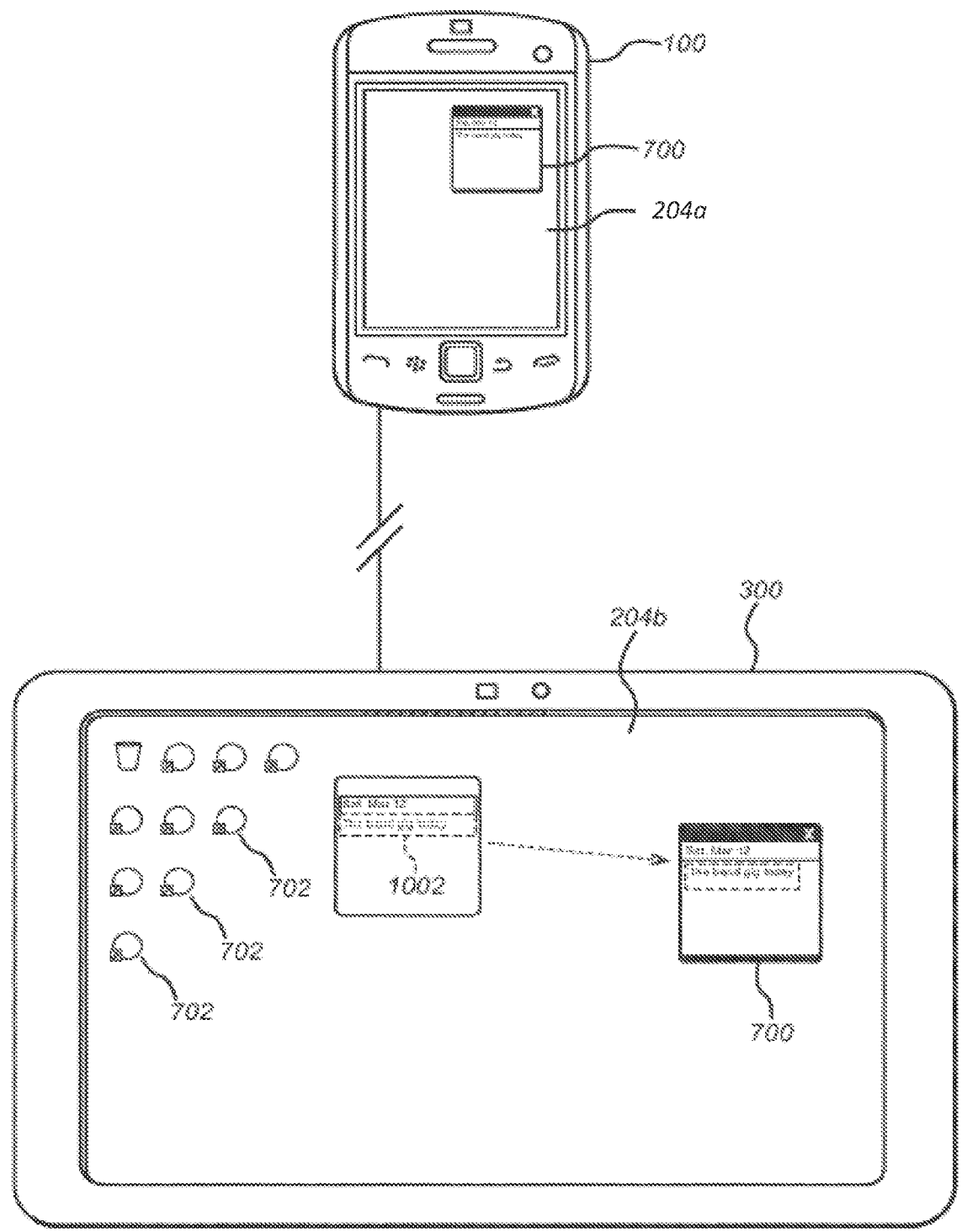
FIG. 10 is an example display showing outputs of the generated display objects.

FIG. 9 is a flow diagram showing an exemplary method of receiving user input via the display object 700 at block 610 of method 600. FIG. 10 depicts the display screens 204a and 204b and the display object 700 that are output by the processor 240 during performance of the method 900. It will be appreciated that whilst FIGS. 9 and 10 depict a single display object 700, multiple display objects 700 may also be output during receipt of user input at block 610.

At block 902, a processor of the personal computer 500 generates a second display object 1002 pertaining to data stored in, or accessible to, the personal computer 500. The data may, for example, be stored in a memory such as the flash memory 244, the random access memory (RAM) 246, the read only memory (ROM) 248, etc. which is in communication with the personal computer 500 via any suitable wired or wireless connection.

The data to which the second display object 1002 pertains may be audio, image, text, or any other type of data and may be associated with an application being executed by the processor of the personal computer 500.

At block 904, the processor of the personal computer 500 outputs the second display object on the screen 204b. In the exemplary output depicted in FIG. 10, the display object 1002 pertains to information about an appointment associated with a calendar application being executed by the processor of the personal computer 500. The display object 1002 is output on an area of display screen 204b associated with a display object pertaining to the calendar application being executed by the laptop processor.

At block 906, the processor of the personal computer 500 receives a user input comprising 'dragging and dropping' the display object 1002 onto the display object 700. As is known in the art, 'dragging and dropping' a display object comprises a user selecting (or 'grabbing') the display object 1002, which is output on a first area of a display screen, and 'dragging' or moving the display object 1002 from the first area of the display screen to a second area of the display screen.

As depicted in FIG. 10, a user input comprising dragging and dropping the display object 1002 onto the display object 700 comprises the user selecting the display object 1002 and moving it from a first output area on the screen 204b to an area of the screen 204b on which at least part of the display object 700 is output.

In the exemplary embodiment of FIG. 10, the display object 1002 representing a calendar appointment is dragged from its location within the display object associated with the calendar application being executed by the laptop processor, and 'dropped' or moved to an area on which at least a part of the display object 700 is output (which pertains to a calendar application being executed by the processor 240 of the mobile device 100).

At block 908, responsive to the display object 1002 being 'dropped' onto the display object 700, the processor 240 of the mobile device 100 supplies the data associated with the display object 1002 to the application to which the display object 700 pertains.

In the example of FIG. 10, responsive to the display object 1002 being dropped onto an area of the display object 700, the processor 240 of the mobile device 100 supplies the calendar appointment data depicted by the display object 1002 to the calendar application being executed on the mobile device 100 (i.e. the calendar application to which the display object 700 pertains). In this manner, data can be easily transferred from the personal computer 500 to an application running on the mobile device 100.

It will be appreciated that, in addition to the examples discussed in relation to FIGS. 9 and 10, data may be alternatively be input from the personal computer 500 via the display object 700 using any other suitable techniques, such as copying and pasting etc.

Irrespective of the type of user input received via the display object 700 on the display screen 204b, responsive to the receipt of the input the processor 240 of the mobile device 100 may update the display object 700 output on the screen 204a and/or the screen 204b to reflect the user input. For example, if the display object 700 output on the screen 204b is a window into which a user enters a character string, the processor 240 of the mobile device 100 may update or re-generate the display object 700 output on the screen 204a and/or the screen 204b to reflect the character string.

Similarly, if the display object 700 is representative of a calendar application and the input received by the processor 240 comprises data relating to an appointment, the processor 240 may update or re-generate the display object 700 to display the input appointment details.

The processor 240 may update the display object 700 on receipt of an input. Additionally or alternatively, the processor 240 of the mobile device 100 may update the display object 700 at regular or irregular intervals whilst executing the application to which the display object 700 pertains.

At block 612, the processor 240 of the mobile device 100 executes, updates, or manipulates the application in accordance with the received user input. For example if the user input comprises a command or instruction associated with execution of the application, the processor 240 of the mobile device 100 may execute the application in accordance with the command. Similarly if the user input comprises data input, the processor 240 of the mobile device 100 may store the data in a memory associated with the application. For example, if the display object 700 pertains to a calendar application and appointment data input is received via the display object 700 on the display screen 204b, the processor 240 of the mobile device 100 may save the input appointment data in a memory associated with the calendar application.

It will be appreciated that the foregoing discussion relates to exemplary embodiments of the invention. However, in other embodiments, the order in which steps are performed may be changed or one or more of the described steps may be omitted.

What is claimed is:

1. A method of generating a display object, wherein the method comprises:
    executing, by a first device, an application;
    generating, by the first device, a display object associated with the application;
    displaying, by the first device, the display object on a first display of the first device, wherein the display object is presented as one element within a graphical user interface;
    modifying, by the first device, the display object to a suitable format for display on a second display of a second device;
    transmitting, by the first device, the display object modified to the suitable format for display on the second display to the second device for rendering on the second display while the display object is displayed on the first display, wherein the display object is presented on the second display as an active object configured to receive one or more user inputs by way of a direct user interaction with the display object at the second device, wherein the second display has a different size than the first display;
    receiving, by the first device from the second device, the one or more user inputs to the application;
    updating, by the first device, the application based on the one or more user inputs received via the display object at the second device;
    generating, by the second device, a second display object representative of data stored on the second device;
    moving the second display object to an area of the second device;
    transmitting, in response to moving the second display object to the area, the second display object to the first device; and
    updating, by the first device, in response to receiving the second display object, the display object displayed on the first device based on the data of the second display object.

2. The method of claim 1, wherein the display object is a data object.

3. The method of claim 1, further comprising updating the display object in accordance with the one or more user inputs.

4. The method of claim 1, wherein the display object displayed on the first device is a read-only display object associated with the application.

5. The method of claim 4, wherein one or both of the display object and the read-only display object are representative of a Graphical User Interface associated with the application.

6. The method of claim 4, wherein one or both of the display object and the read-only display object are representative of a current status of the application.

7. The method of claim 1, wherein the application is a calendar application and the display object is configured to receive a user input of a calendar appointment on the second device.

8. The method of claim 1, wherein the first device is a mobile device.

9. The method of claim 8, wherein the second device is a personal computer.

10. A non-transitory computer-readable medium comprising executable instructions which, when executed by a processor of a first device, cause the first device to:
    execute an application;
    generate a display object associated with the application;
    display the display object on a first display of the first device, wherein the display object is presented as one element within a graphical user interface;
    modify the display object at the first device to a suitable format for display on a second display of a second device;
    transmit the display object modified to the suitable format for display on the second display to the second device for rendering on the second display while the display object is displayed on the first display, wherein the display object is presented on the second display as an active object configured to receive one or more user inputs by way of a direct user interaction with the display object at the second device, wherein the second display has a different size than the first display;
    receive, from the second device, the one or more user inputs to the application;
    update, by the first device, the application based on the one or more user inputs received via the display object at the second device;

generate, by the second device, a second display object representative of data stored on the second device;

move the second display object to an area of the second device;

transmit, in response to moving the second display object to the area, the second display object to the first device; and update, by the first device, in response to receiving the second display object, the display object displayed on the first device based on the data of the second display object.

11. A first electronic device comprising:

a display;

a memory configured to store instructions;

a processor in communication with the first display and the memory, wherein the processor is configured to execute the instructions to cause the first electronic device to:

execute an application;

generate a display object associated with the application;

display the display object on the first display, wherein the display object is presented as one element within a graphical user interface;

modify the display object to a suitable format for display on a second display of a second electronic device while the display object is being displayed on the first electronic device;

transmit the display object modified to the suitable format for display on the second display to the second electronic device for rendering and display on the second display while the display object is displayed on the first display, wherein the display object is presented on the second display as a local active object configured to receive one or more user inputs for the application by way of a direct user interaction with the display object;

receive the one or more user inputs to the application from the second electronic device;

update the application based on the one or more user inputs received from the second electronic device;

generate, by the second electronic device, a second display object representative of data stored on the second electronic device;

move the second display object to an area of the second device;

transmit, in response to moving the second display object to the area, the second display object to the first electronic device; and update, by the first electronic device, in response to receiving the second display object, the display object displayed on the first electronic device based on the data of the second display object.

12. The first electronic device of claim 11, wherein the display object is a data object.

13. The first electronic device of claim 11, wherein the instructions further cause the first electronic device to update the display object in accordance with the one or more user inputs.

14. The first electronic device of claim 11, wherein the one or more user inputs received from the second electronic device comprises data, and wherein the instructions further cause the first electronic device to supply the data to the application.

15. The first electronic device of claim 11, wherein the display object displayed on the first electronic device is a read-only display object associated with the application.

16. The first electronic device of claim 15, wherein one or both of the display object and the read-only display object are representative of a Graphical User Interface associated with the application.

17. The first electronic device of claim 15, wherein one or both of the display object and the read-only display object are representative of a current status of the application.

18. The first electronic device of claim 11, wherein the application is a calendar application and wherein the display object is configured to receive a user input of a calendar appointment from the second electronic device.

19. The first electronic device of claim 11, wherein the first electronic device is a mobile device.

20. The first electronic device of claim 19, wherein the second electronic device is a personal computer.

* * * * *